US008743243B2

(12) United States Patent
Nakayama et al.

(10) Patent No.: US 8,743,243 B2
(45) Date of Patent: Jun. 3, 2014

(54) INFORMATION PROCESSING APPARATUS, INFORMATION PROCESSING METHOD AND RECORDING MEDIUM FOR ELECTRONIC EQUIPMENT INCLUDING AN ELECTRONIC CAMERA

(75) Inventors: Tadashi Nakayama, Chofu (JP); Keita Kimura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 286 days.

(21) Appl. No.: 13/067,527

(22) Filed: Jun. 7, 2011

(65) Prior Publication Data

US 2011/0228107 A1 Sep. 22, 2011

Related U.S. Application Data

(63) Continuation of application No. 12/801,753, filed on Jun. 23, 2010, now abandoned, which is a continuation of application No. 12/213,648, filed on Jun. 23, 2008, now abandoned, which is a continuation of application No. 11/036,371, filed on Jan. 18, 2005, now abandoned, which is a continuation of application No. 08/943,705, filed on Oct. 3, 1997, now abandoned.

(30) Foreign Application Priority Data

| Oct. 3, 1996 | (JP) | 8-263031 |
| Oct. 3, 1996 | (JP) | 8-263033 |
| Oct. 3, 1996 | (JP) | 8-263034 |
| Apr. 1, 1997 | (JP) | 9-082865 |
| Apr. 1, 1997 | (JP) | 9-082866 |
| Apr. 1, 1997 | (JP) | 9-082867 |

(51) Int. Cl.
*H04N 5/225* (2006.01)
*H04N 5/76* (2006.01)

(52) U.S. Cl.
USPC .............. 348/231.2; 348/207.1; 348/207.11

(58) Field of Classification Search
CPC .......... H04N 2101/00; H04N 5/23203; H04N 5/772; H04N 5/222; H04N 5/45; H04N 5/44513; G06F 17/24; G06K 9/033; G11B 2220/2545
USPC ........ 348/207.1–207.11, 231.2, 722, 348/563–569; 369/47.12, 83; 386/4, 52–64; 382/311; 715/255–272, 716–726, 732
See application file for complete search history.

(56) References Cited

U.S. PATENT DOCUMENTS

| 5,436,657 A | 7/1995 | Fukuoka |
| 5,515,496 A * | 5/1996 | Kaehler et al. ............... 715/762 |

(Continued)

FOREIGN PATENT DOCUMENTS

| JP | A-4-156791 | 5/1992 |
| JP | A-5-260425 | 10/1993 |

(Continued)

OTHER PUBLICATIONS

Dec. 1, 2009 Office Action for Japanese Patent Application No. 9-82865 (with translation).

(Continued)

*Primary Examiner* — Roberto Velez
*Assistant Examiner* — Pritham Prabhakher
(74) *Attorney, Agent, or Firm* — Oliff PLC

(57) ABSTRACT

A personal computer to which electronic equipment, such as, an electronic camera is connected reads recording units that are recorded in the electronic camera and displays a table consisting of recording information. In recording information such as a main image, a sub image and sound in the electronic camera, data within the electronic camera are inter-related by an index which indicates that the information is part of a common recording unit. The date having the same index are output and displayed in a same thumbnail area. When a recording unit for deletion is designated from the table; check boxes are displayed according to information contained in the recording unit. For example, an "x" is displayed in the check box of the information to be deleted, indicating that the information is a target of deletion. After the selection of information is completed and an "OK" button is pressed, the personal computer sends a control command to the electronic camera and deletes the designated information. Rather than deletion, the designated information can be read from the electronic camera into the personal computer.

18 Claims, 17 Drawing Sheets

(56) References Cited

U.S. PATENT DOCUMENTS

| | | | |
|---|---|---|---|
| 5,528,293 A | 6/1996 | Watanabe | |
| 5,551,021 A * | 8/1996 | Harada et al. | 382/305 |
| 5,678,046 A * | 10/1997 | Cahill et al. | 707/829 |
| 5,706,097 A * | 1/1998 | Schelling et al. | 358/296 |
| 5,706,457 A * | 1/1998 | Dwyer et al. | 715/835 |
| 5,708,826 A * | 1/1998 | Ikeda et al. | 715/209 |
| 5,724,579 A | 3/1998 | Suzuki | |
| 5,754,227 A | 5/1998 | Fukuoka | |
| 5,760,767 A * | 6/1998 | Shore et al. | 715/723 |
| 5,760,917 A | 6/1998 | Sheridan | |
| 5,796,428 A | 8/1998 | Matsumoto et al. | |
| 5,806,072 A | 9/1998 | Kuba et al. | |
| 5,819,261 A | 10/1998 | Takahashi et al. | |
| 5,845,046 A | 12/1998 | Hirayama et al. | |
| 5,852,438 A | 12/1998 | Tomizawa et al. | |
| 5,877,781 A | 3/1999 | Tomizawa et al. | |
| 5,877,819 A | 3/1999 | Branson | |
| 5,900,870 A * | 5/1999 | Malone et al. | 715/866 |
| 5,903,309 A * | 5/1999 | Anderson | 348/333.02 |
| 5,913,078 A | 6/1999 | Kimura et al. | |
| 5,917,488 A * | 6/1999 | Anderson et al. | 715/838 |
| 5,926,208 A | 7/1999 | Noonen et al. | |
| 5,966,122 A | 10/1999 | Itoh | |
| 5,973,731 A | 10/1999 | Schwab | |
| 5,974,386 A | 10/1999 | Ejima et al. | |
| 6,014,170 A | 1/2000 | Pont et al. | |
| 6,026,232 A | 2/2000 | Yogeshwar et al. | |
| 6,092,067 A * | 7/2000 | Girling et al. | 1/1 |
| 6,169,575 B1 | 1/2001 | Anderson et al. | |
| 6,192,191 B1 | 2/2001 | Suga et al. | |
| 6,334,025 B1 * | 12/2001 | Yamagami | 386/241 |
| 6,415,097 B1 | 7/2002 | Takei et al. | |
| 2002/0054212 A1 | 5/2002 | Fukuoka | |

FOREIGN PATENT DOCUMENTS

| | | |
|---|---|---|
| JP | A-6-225194 | 8/1994 |
| JP | A-7-184160 | 7/1995 |
| JP | A-7-245723 | 9/1995 |
| JP | A-8-147952 | 6/1996 |
| JP | A-8-190145 | 7/1996 |
| JP | A-8-314954 | 11/1996 |
| JP | A-2005-020351 | 1/2005 |

OTHER PUBLICATIONS

Dec. 1, 2009 Office Action for Japanese Patent Application No. 9-82866 (with translation).

* cited by examiner

INFORMATION PROCESSING APPARATUS, INFORMATION PROCESSING METHOD AND RECORDING MEDIUM FOR ELECTRONIC EQUIPMENT INCLUDING AN ELECTRONIC CAMERA

This is a Continuation of application Ser. No. 12/801,753 filed Jun. 23, 2008, which is a Continuation of application Ser. No. 12/213,648 filed Jun. 23, 2008, which is a Continuation of application Ser. No. 11/036,371 filed Jan. 18, 2005, which is a Continuation of application Ser. No. 08/943,705 filed Oct. 3, 1997. The disclosures of the prior applications are hereby incorporated by reference herein in their entirety.

INCORPORATION BY REFERENCE

The disclosures of the following Japanese priority applications are herein incorporated by reference: JP9-082865, filed Apr. 1, 1997; JP9-082867, filed Apr. 1, 1997; JP9-082866, filed Apr. 1, 1997; JP8-263031, filed Oct. 3, 1996; JP8-263033, filed Oct. 3, 1996; and JP8-263034, filed Oct. 3, 1996.

BACKGROUND OF THE INVENTION

1. Field of Invention

This invention relates to an information processing apparatus, an information processing method and a recording medium, and in particular relates to an information processing apparatus, an information processing method and a recording medium that execute a predetermined process on data that include main image data, sub image data and sound data, which are input from electronic equipment connected to the information processing apparatus.

2. Description of Related Art

In a conventional electronic camera, the image of the object being shot is first digitized and then is data-compressed by means of a predetermined method. The compressed digital data are then recorded in a memory or a recording medium of the electronic camera or an attached personal computer, for example.

The image recorded in such an electronic camera may be read into the personal computer. Various processes may then be executed on the image using functions that are provided in the personal computer.

With recent technological advances, electronic cameras are being developed that are capable of simultaneously recording an image (hereafter referred to as the main image) and other information such as a memo, which is overlaid on the main image and recorded, as well as sound and other sub images, which are also added to the main image, to form a composite image. The composite image is referred to hereafter as a recording unit. However, when reading the information recorded in the memory of the electronic camera, particularly when, for example, the information is displayed as a table, a problem occurs in that a proper display method has not been established.

Furthermore, problems arise when trying to delete some of the sub images. FIG. 16 shows a process in which information recorded in an electronic camera is deleted by means of an operation from the personal computer that is connected to the electronic camera.

In step S61, the personal computer receives an input designating a recording unit to be deleted. The control program then proceeds to step S62.

In step S62, the personal computer receives an input indicating whether to execute the deletion process. If in step S62, the input indicates execution of the deletion process (YES), the control program moves to step S63. If the input does not indicate execution of the deletion process (NO), the process ends (END).

In step S63, the personal computer deletes the designated recording unit from the memory of the electronic camera, for example. If a plurality of information are contained in the recording unit, all of the information will be deleted.

Hence, a conventional process such as that described above has the problem that selected information contained in a recording unit cannot be deleted (while other non-selected information in that recording unit is not deleted) by means of an operation from the personal computer.

Finally, a case will be considered where information recorded in an electronic camera is read by a personal computer and is recorded on a hard disk drive connected to the personal computer.

FIG. 17 shows a process in which the information recorded in the electronic camera is read by the personal computer and is recorded on the hard disk drive.

In step S71, the personal computer determines whether the specific recording unit is designated. If the specific recording unit is not designated (NO), the control program returns to step S71 and repeats the same process. If the specific recording unit is designated (YES), the control program moves to step S72.

In step S72, the personal computer displays the stored dialogue described in FIG. 18 and displays the file name of the file contained in the recording unit designated in step S71 (the file corresponding to the data being contained in the recording unit).

In this example, three files "Image1.jpg" (main image data file), "Image1.rlg" (sub image data file) and "Image1.snd" (sound data file) are displayed in a box below "storage holder" (see FIG. 18). The control program then moves to step S73.

In step S73, a new file name for recording the above data in the hard disk drive is input. For example, "NewImage", which is shown in the box below "File Name" in the stored dialogue of FIG. 18, is input to the hard disk. The control program then moves to step S74.

In step S74, the personal computer determines whether to store the file being displayed in the stored dialogue. In other words, the personal computer determines whether the "store button", which is shown to the right side of the store dialogue of FIG. 18, has been pressed. If the "store button" was pressed (YES), the control program moves to step S75. If the "cancel button" was pressed (NO), the process ends (END).

In step S75, the designated file is stored in the hard disk drive with a new name. In other words, three files, Image1.jpg, Image1.rlg, and Image1.snd, which are displayed in the box shown in upper section of FIG. 18, are renamed and recorded in the hard disk drive as NewImage.jpg, NewImage.rlg and NewImage.snd, respectively.

In the process described above, information is read by the personal computer from the electronic camera for each recording unit and is recorded in the hard disk drive. However, there is still the problem that selected information contained in the recording unit cannot be output and recorded on the hard disk drive. Instead, all the information in the recording unit is recorded on the hard disk.

SUMMARY OF THE INVENTION

Considering the problems described above, an object of the invention is to make it possible to read information into a personal computer from an electronic camera, which is capable of recording a plurality of information besides the main image, and to display a table of the information in an easy to understand format.

Another object of the invention is to make it possible to selectively delete, by means of the personal computer, for example, specific information out of all the information recorded in the electronic camera.

Yet another object of the invention is to make it possible to selectively read, using the personal computer, for example, only selected or necessary information out of all the information recorded in the electronic camera, and to record the selected or necessary data in the recording medium.

According to one aspect of the invention, the information processing apparatus comprises an input device for inputting first information relating to the types of data stored on an electronic equipment (e.g., an electronic camera) coupled to the apparatus and second information that identifies inter-relationships among the data. The information processing apparatus also includes a correlating device for correlating the first information into units based on the second information. The information processing apparatus also includes a display information generation device for generating display information from the correlated first information correlated by the correlating device. The display information generated by the display information generation device is output to an output device such as a display.

The information processing method according to this aspect of the invention inputs first information relating to the type of data, inputs second information that describes the inter-relationships (if any) between the data and correlates the first information relating to the type of data being input based on the second information. The method then generates display information from the information relating to the types of data that are correlated by the correlating device and outputs the display information, which is generated by the display information generation device, to a display device.

The recording medium records a control program that correlates the first information into units based on the second information. The control program generates display information from the correlated first information. The control program then causes the output of the display information to a display device.

According to this aspect of the invention, information relating to the types of data and index information describing the inter-relationships between data are input to the information processing apparatus. Information relating to the types of data being input are then correlated, based on the index information being input. Next, display information is generated from the information relating to the types of data that are correlated. Finally, the display information is output to a display device, enabling a speedy search and reproduction of the data recorded in the electronic camera.

According to another aspect of the invention, the information processing apparatus includes a designating device for designating recording units (e.g., from an electronic camera) having data that is to be deleted and for specifying which of the data in the recording unit is to be deleted. The apparatus also includes a deletion device for deleting the specified data contained in the recording unit.

The information processing method inputs a designation of the recording unit for deletion, designates the type of data in the recording unit that is to be deleted, and deletes the designated data. The recording medium includes a control program to delete specific data contained in a designated recording unit.

According to this aspect of the invention, a designation of the recording unit having data that is to be deleted and the designation of the type of data to be deleted are input into the personal computer, and the designated data contained in the designated recording unit is deleted. Thus, specific information from all the information that are recorded in an electronic camera may be deleted using the personal computer, for example.

According to another aspect of the invention, the information processing apparatus includes a designation device for designating a recording unit for processing and for designating the type of data in the recording unit that is to be processed. The information processing apparatus also includes a reading device for reading the designated data contained in the designated recording unit from the electronic equipment into the information processing apparatus.

The information processing method according to this aspect of the invention, inputs the designation of the recording unit for processing and inputs a designation of the type of data to be processed, and reads the designated data contained in the recording unit.

The recording medium records a control program which, when the recording unit for processing and the type of data are designated, reads the designated data contained in the recording unit.

According to this aspect of the invention, a designation of the recording unit and a designation of the type(s) of data to be processed are input, and the designated data contained in the recording unit is read from the electronic equipment (e.g., an electronic camera). Hence, only the desired data contained in the recording unit needs to be read from the electronic equipment, and may be output and recorded in a recording device. This enables the file size to be reduced. As a result, the recording capacity necessary for recording the file may be reduced.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Figure 1:
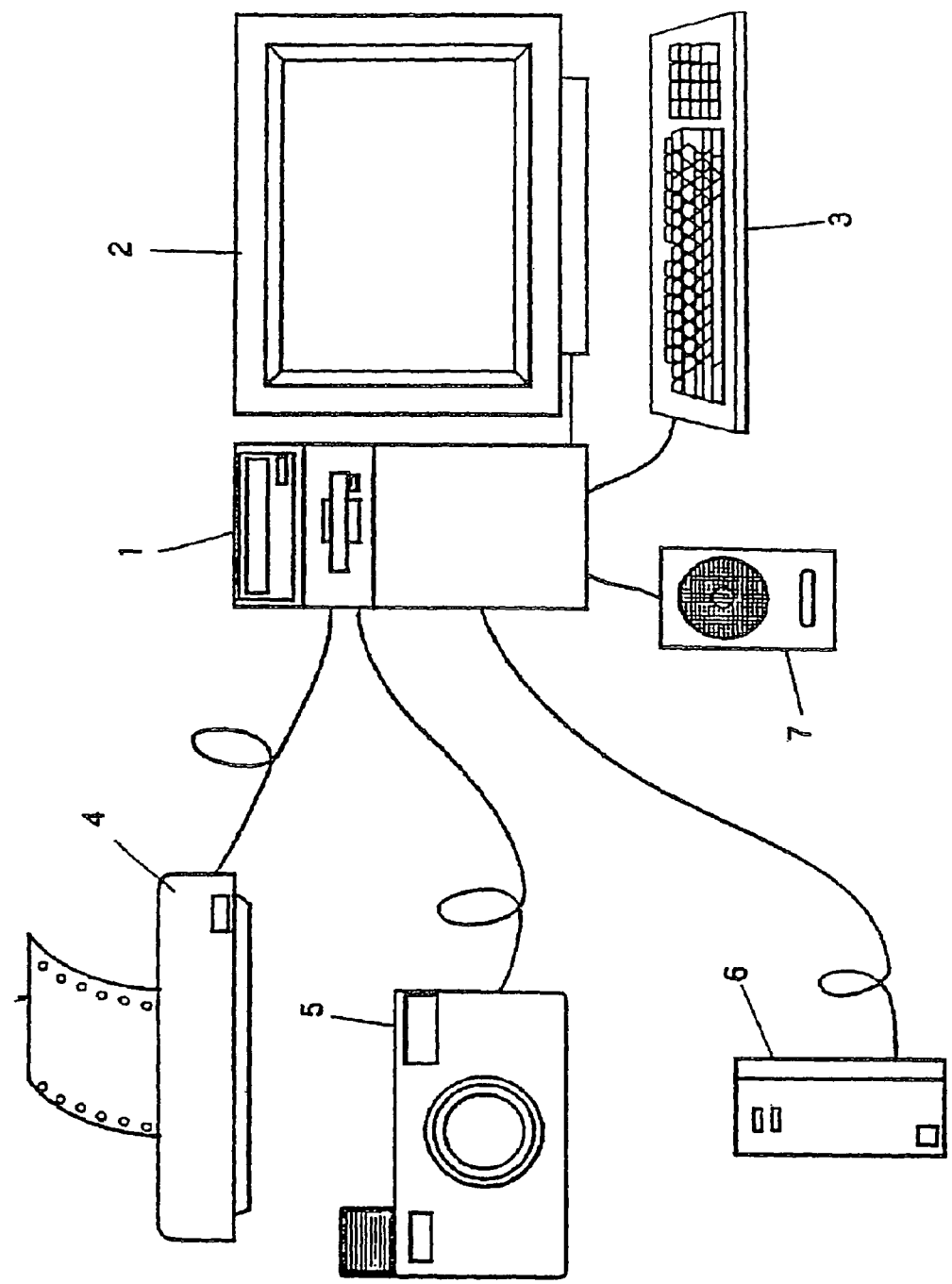
FIG. 1 is a configuration of an embodiment of an information processing apparatus of the present invention.

FIG. 1 shows a configuration of an embodiment of an information processing apparatus. A personal computer 1 is connected to a plurality of peripherals (electronic equipment) to form an information system. Data are input from the peripherals, and the processed data are output to the desired peripherals. A cathode ray tube (CRT) display 2, or similar display device, displays the image signals that are output from the personal computer 1.

A keyboard 3 (one type of possible input means) or a mouse (not shown) inputs the predetermined information into the personal computer 1. A printer 4 prints text data and image data, which are output from the personal computer 1, to paper.

An electronic camera 5 compresses data by means of a predetermined method and records the main image. The electronic camera 5 also compresses and stores sub images such as memos and line drawings, and sound information, for example, which serve as support or auxiliary information for the main image. Information recorded in the electronic camera 5 is transferred to the personal computer 1 through an input/output port. Conversely, the electronic camera may be controlled by sending a predetermined control command from the personal computer 1 to the electronic camera 5.

A hard disk drive 6 is a large capacity external memory device that records information output from the personal computer 1. The personal computer 1 reads the recorded information upon request.

A speaker 7 receives the sound data (digital data), which are output from the electronic camera 5, executes a predetermined process, and outputs a corresponding sound. In other words, the sound data, which are supplied from the personal computer 1, are converted to analog signals by a D/A converter (not shown) inside the speaker 7. The analog signals are amplified by an amplifier (not shown), which is also installed inside the speaker 7, with a predetermined gain, and then are output as sound.

Figure 2:
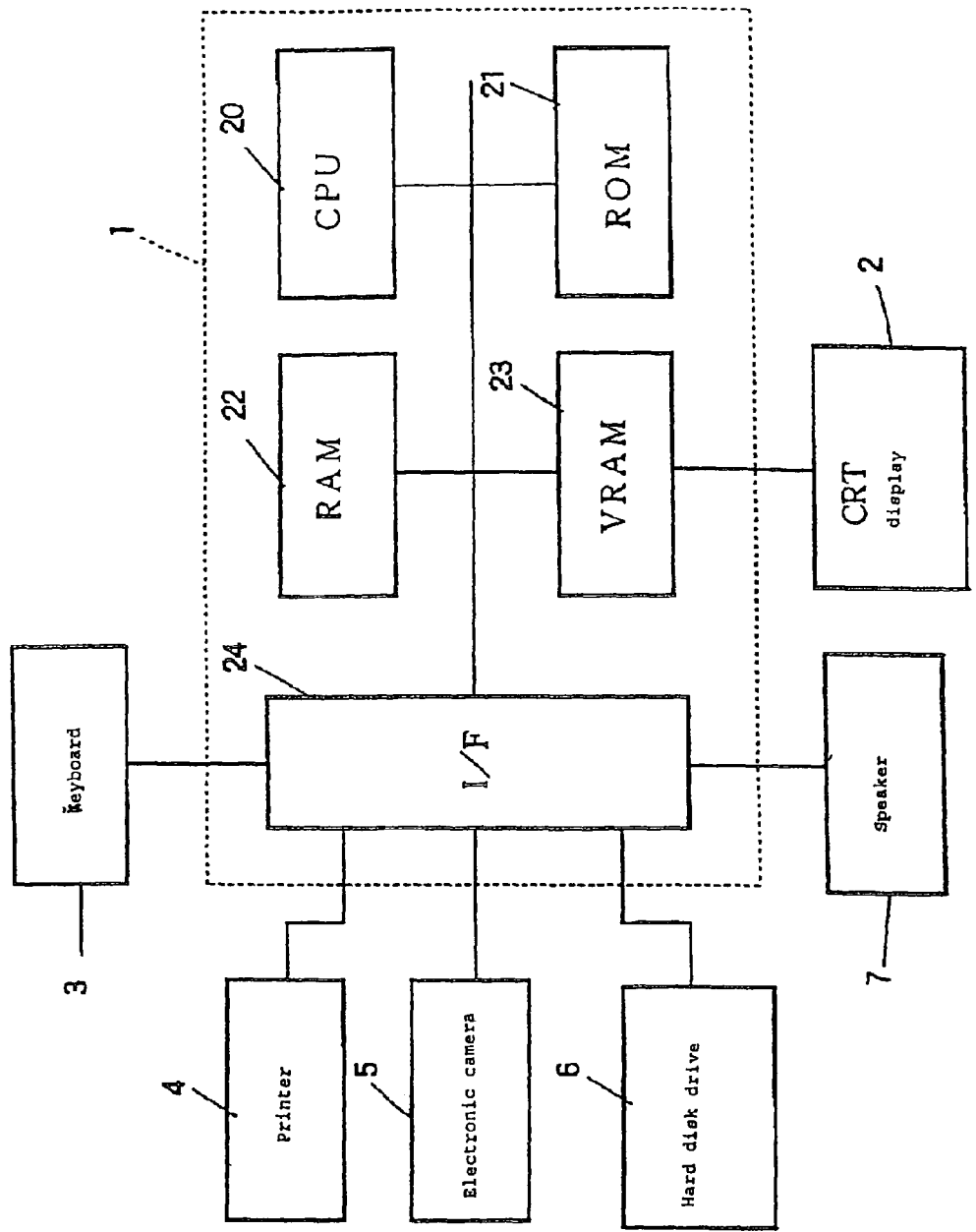
FIG. 2 is a block diagram of a personal computer shown in FIG. 1.

FIG. 2 is a block diagram showing an example of a detailed structure of the personal computer 1. In FIG. 2, the same parts as in FIG. 1 are identified with the same symbols whose explanations are omitted for convenience.

The personal computer 1 includes a central processing unit (CPU) 20 (which functions as correlating means and display information generation means), a read only memory (ROM) 21, a random access memory (RAM) 22, a video random access memory (VRAM) 23 (which functions as an output means), and an interface (I/F) 24 (which functions as an input means).

The CPU 20 executes various procedures and performs overall control of the information processing apparatus. The ROM 21 stores a program such as an initial program loader (IPL). When the personal computer 1 is turned on, the CPU 20 executes the IPL, and programs such as an operating system (OS) are loaded from the hard disk drive 6, for example.

The RAM 22 temporarily stores data when the CPU 20 executes an algorithm. At the same time, the RAM 22 sequentially reads and stores parts of the program stored in the hard disk drive.

In the VRAM 23, bit map data consisting of text data such as characters and texts, and graphic data such as graphics and images being overlaid are stored. The bit map data stored in the VRAM 23 are converted to image signals and are displayed on the CRT display 2.

Peripherals such as the keyboard 3, the printer 4, the electronic camera 5, the hard disk drive 6, and the speaker 7 are connected to the I/F 24. The I/F 24 mutually converts the data format in each peripheral and the data format in the personal computer 1, enabling exchange of the data.

A plurality of input/output ports for connecting peripherals are also provided in the I/F 24 in such a manner that one peripheral is connected to one port. The CPU 20 exchanges information among peripherals through these input/output ports.

Figure 3:
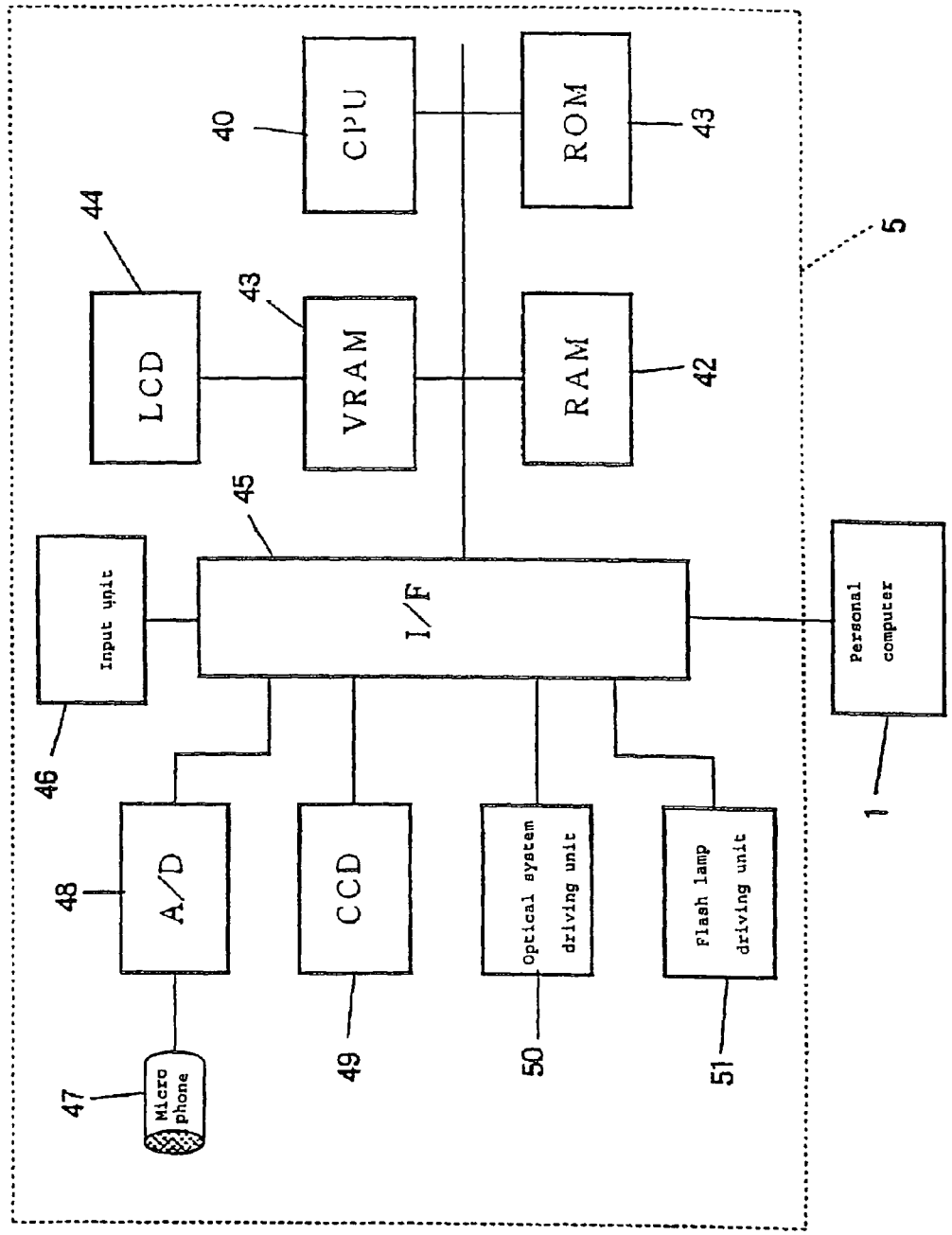
FIG. 3 is a block diagram of an electronic camera shown in FIG. 1.

FIG. 3 is a block diagram of an example of the electronic camera 5. The electronic camera 5 includes a CPU 40, a ROM 41, a RAM 42, a VRAM 43, a liquid crystal display (LCD) 44, an I/F 45, an input unit 46, a microphone 47, an A/D converter 48, a charge coupled device (CCD) 49, an optical system driving unit 50 and a flash lamp driving unit 51.

The CPU 40 executes various procedures and executes control of the electronic camera 5. Various programs to be executed by the CPU 40 are stored in the ROM 41.

An image of the object (main image), data such as a memo (sub image) and data such as sound, are stored in the RAM 42. Data used by the CPU 40 for programs are temporarily stored in the RAM 42.

The VRAM 43 stores bit map data consisting of text data such as characters and texts, and graphic data such as graphics and overlaid images. The bit map data stored in the VRAM 23 are converted to image signals and are displayed on the LCD 44. The LCD 44 displays images corresponding to the bit maps stored in the VRAM 43.

The input unit 46, the A/D converter 48, the CCD 49, the optical system driving unit 50, the flash lamp 51 and the personal computer 1 are connected to the I/F 45. The CPU 40 drives these apparatus through the I/F 45.

The input unit 46 includes a touch tablet to be used for inputting memo information including line drawings, for example, and a release button to be operated during shooting.

The microphone 47 converts sounds into corresponding analog electric signals and supplies them to the A/D converter 48. The A/D converter 48 converts the electric signals into digital signals and supplies them to the I/F 45.

The CCD 49 converts the main image entering the electronic camera 5 through an optical system (not shown) into corresponding electric signals (image signals) and outputs the resulting image signals.

The optical system driving unit 50 is controlled by the CPU 40 and executes auto focus and auto zooming, for example, by appropriately controlling the lenses that form the optical system.

The flash lamp driving unit 51 is also controlled by the CPU 40 and flashes a flash lamp (not shown).

Figure 4:
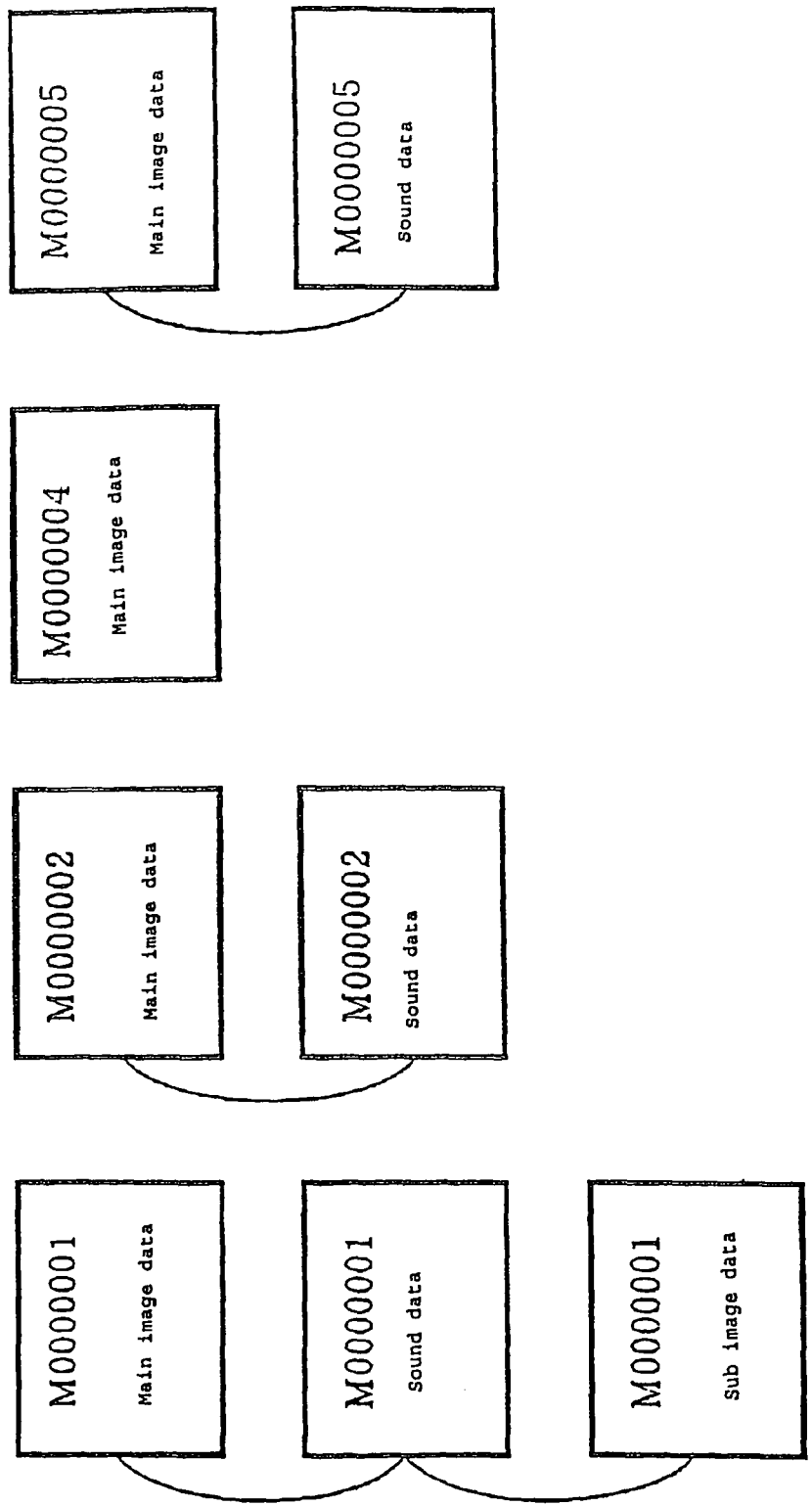
FIG. 4 is a schematic drawing of data that is stored in a RAM of FIG. 3.

FIG. 4 outlines the storage format of the main image data, the sub image data and the sound data that are stored in the RAM 42 shown in FIG. 3.

Sound data that are recorded simultaneously with a predetermined main image or sub image, such as a memo, are given the same index information (M0000001, for example) to provide a mutual relationship between the data. For example, the main image data on the left edge, the sound data below the main image data, and the sub image data below the sound data are given the same index of M0000001. The main image data to the right of the first main image data and the sound data below the second main data are given the same index of M0000002.

The main image data to the right of the second main image has no sound data or sub image data attached and thus includes the main image only. The index of M0000004 is given to the third main image data. The main image data to the right of the third main image data have only sound data attached and the index M0000005 is given to these data. In this instance, the index information are generated and given to the data by the CPU 40 when the main image is shot.

Figure 5:
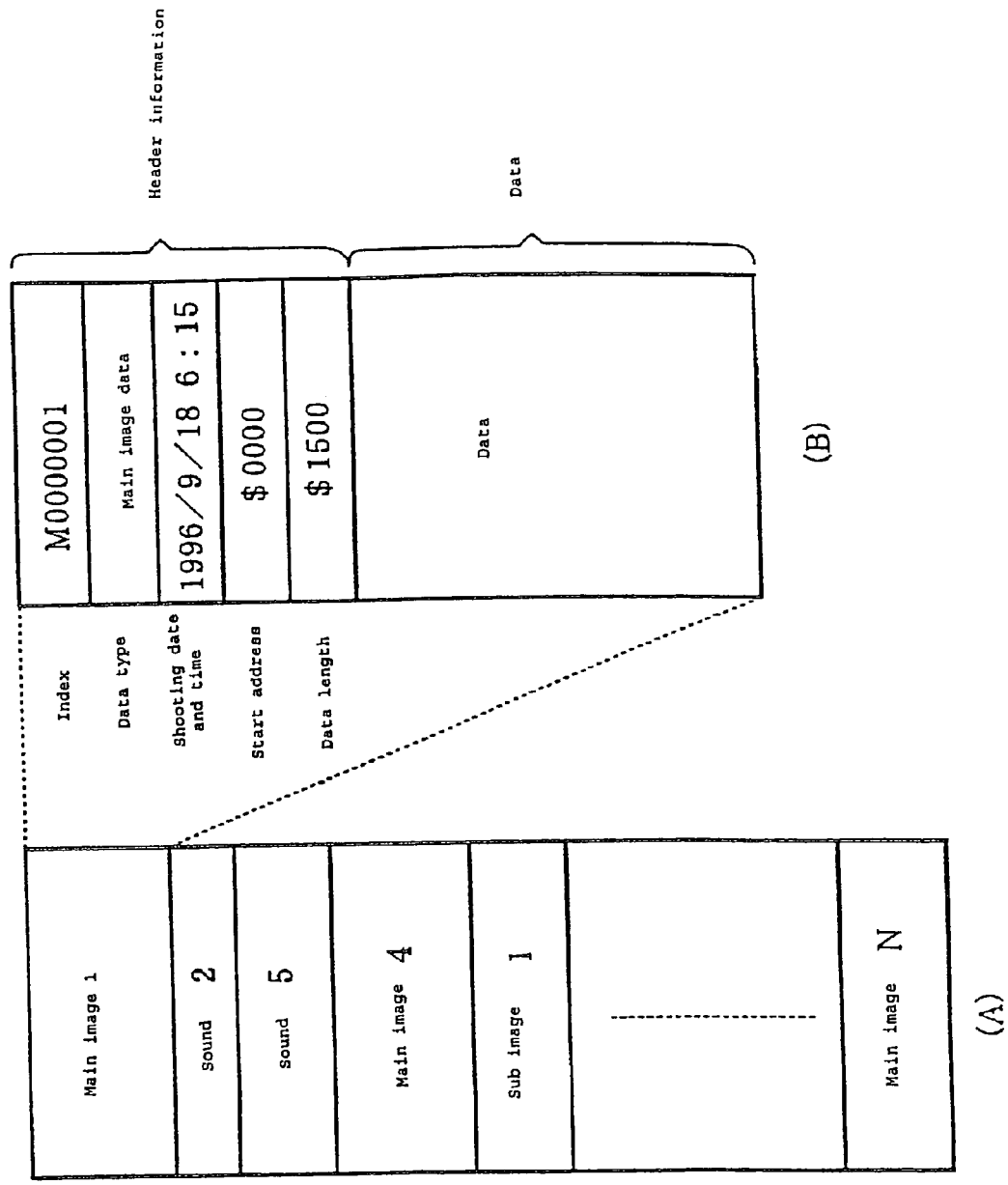
FIG. 5 is a configuration of data storage in the RAM of FIG. 3.

FIG. 5 shows a storage configuration when the data described above is stored in the RAM 42 shown in FIG. 3. The main image data, sub image data and sound data are randomly stored in RAM 42 as shown at (A) in FIG. 5.

The data structure of the main image 1 is shown at (B) in FIG. 5. The main image data includes header information and image information. The header information includes the aforementioned index information, information indicating the types of data, the shooting date and time, the starting address of the area where the data are stored, and the data length of the image data.

In this example, index information of M0000001 is given and the type of data is a main image data. The shooting date and time is 6:15 a.m., Sep. 18, 1996 (1996/9/18/6:15). The starting address of the area where image data is stored is $0000 and the data length is $1500. Here $ indicates that the numbers following $ represents a base 16 number. The structure of the sub image data and sound data is the same as at (B) in FIG. 5 with the exception of the type of data.

Figure 6:
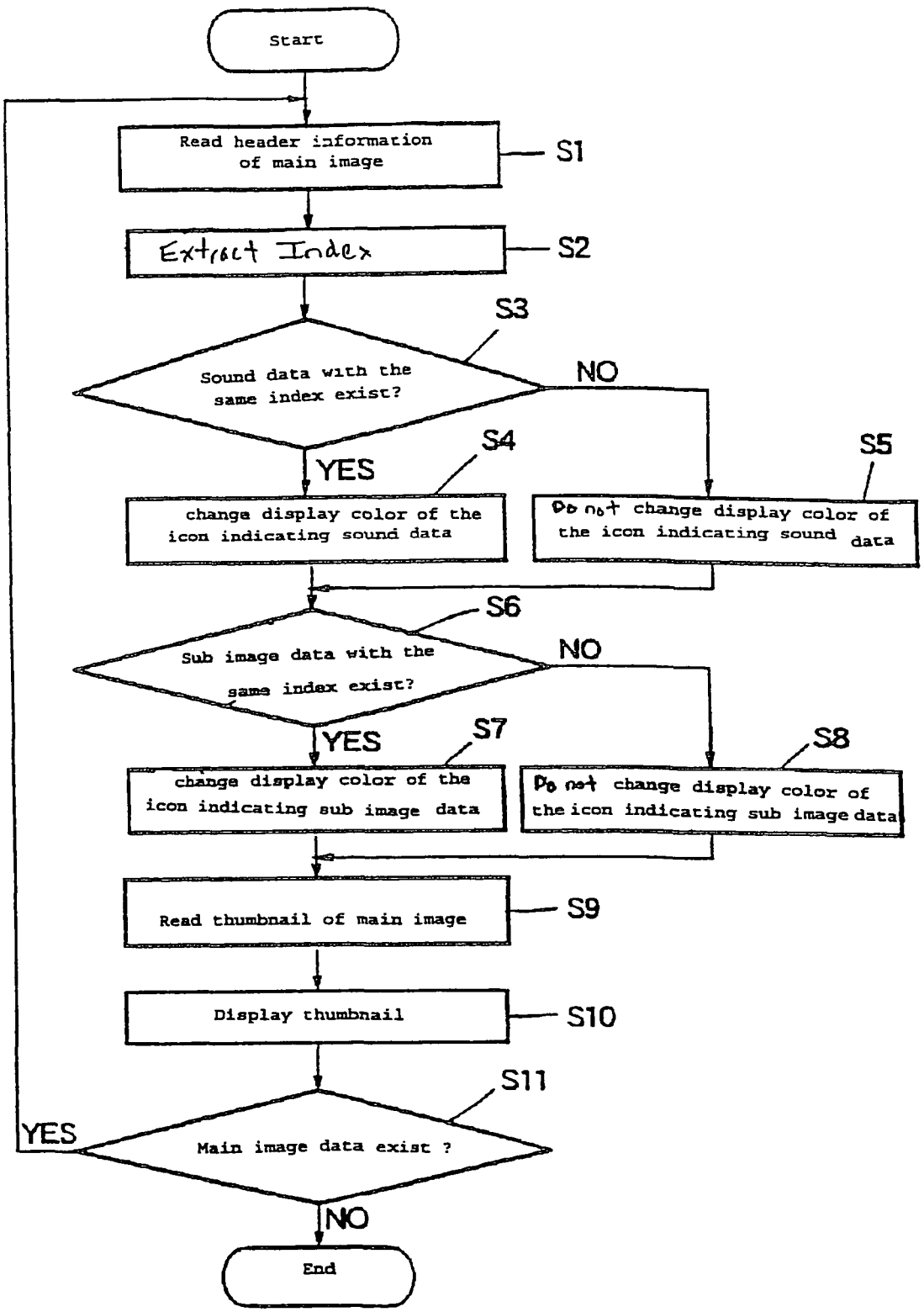
FIG. 6 is a flow chart describing a process that is executed in the personal computer of FIG. 1.

The operation of the configuration of the embodiment described in FIGS. 2 and 3 is explained hereafter, with reference to the flow chart shown in FIG. 6. The control program shown in FIG. 6 is stored in the hard disk drive 6. The control program may be supplied to the user, being stored beforehand in the hard disk drive 6. Alternatively, the control program may be stored in a CD-ROM (compact disk-ROM), which may be copied onto the hard disk drive 6.

The control program shown in FIG. 6 is executed by the personal computer 1. In step S1 the CPU 20 of the personal computer 1 sends a control command to the electronic camera 5 through the I/F 24. As a result, the CPU 40 of the electronic camera 5 searches the first main image data among the data being stored in the RAM 42, the header information of which is sent to the personal computer 1 through the I/F 45. As a result, the personal computer 1 obtains the header information of the main image data. The control program then moves to step S2.

In step S2, the CPU 20 extracts the index from the header information of the main image data. The control program then moves to step S3.

In step S3, the CPU 20 sends the control command to the electronic camera 5 through the I/F 24. Based on the control command that is received, the CPU 40 of the electronic camera 5 searches for sound data having the same index as the main image data. Then the CPU 40 notifies the personal computer 1 whether sound data having the same index exist.

Upon receiving the signals from the electronic camera 5, the CPU 20 determines whether sound data having the same index number exist. If sound data having the same index exist (YES), the control program moves to step S4. If sound data having the same index number does not exist (NO), the control program proceeds to step S5.

In step S4, the CPU 20 causes the VRAM 23 to display an icon representing sound data in a different color from the default display color on the CRT display by writing predetermined data. Then the control program proceeds to step S6.

In step S5, the CPU 20 causes the VRAM 23 to display an icon representing sound data in a default display color on the CRT display by writing predetermined data. Then the control program moves to step S6.

Figure 7:
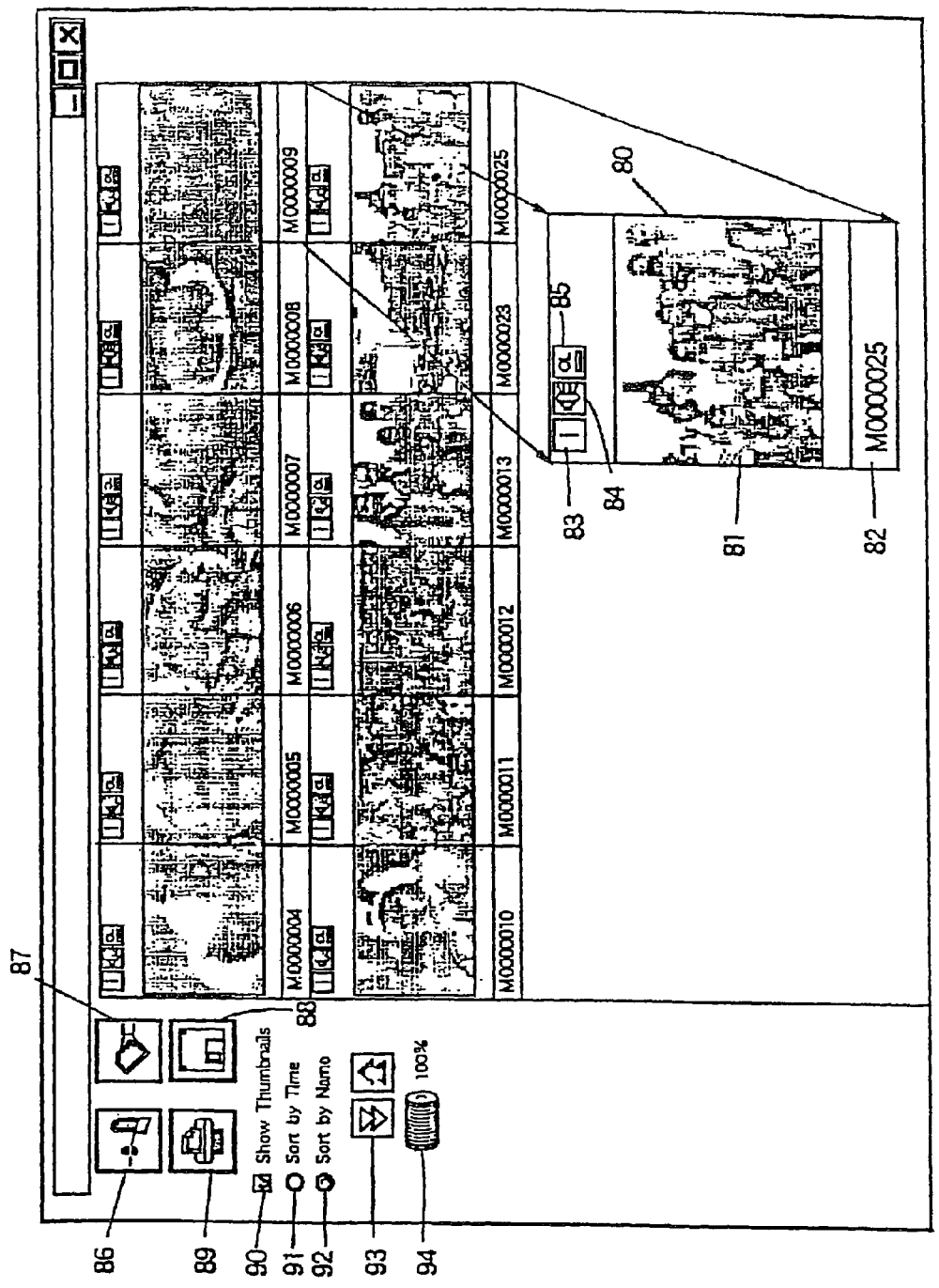
FIG. 7 is a display example of a table that is displayed as a result of the process of FIG. 6.

FIG. 7 is an example of a table displayed on the CRT display by the process of FIG. 6. In this example, a plurality of thumbnail areas (as many as the number recorded in the RAM 42 of the electronic camera 5), which include the thumbnail image 81 (to be explained later), are displayed in a browser window 95 denoted as "Harmony Browser". Each thumbnail image 81 is a reduction of the main image by a fixed ratio. An icon (button) indicating the existence of data other than main image data is also displayed.

In addition to the thumbnail image 81, the thumbnail area 80 includes the index (M0000025 in this example) 82, an information button (button displaying i) 83, a sound button (button displaying a speaker), and an overlay button (button displaying OL) 85, as shown in the partially enlarged drawing.

Upon the execution of steps S4 or S5, a new thumbnail area 80 is displayed in the browser window 95, and the sound button 84 is also displayed. In the process of step S4, the sound button 84 indicates that sound data exist. In this case, the sound button 84 is displayed in a color different from that of the default display color (green, for example). In the process of step S5, the button is displayed in the default display color (black, for example) to indicate the absence of sound data. The function of the button of the thumbnail area 80 and the button on the upper left corner of the browser window 95 will be explained later.

Returning to FIG. 6, in step S6, the CPU 20 sends a control command to the electronic camera 5, which causes the electronic camera 5 to search whether sub image data having the same index as main image data exist.

In step S6, if the CPU 20 determines, based on the response from the electronic camera 5, that sub image data having the same index exist (YES), then the control program moves to step S7. If the CPU 20 determines that the sub image data does not exist (NO), the control program proceeds to step S8.

In step S7, an overlay button 85 shown in FIG. 7 is displayed in a color different from the default display color (green, for example) in order to indicate that the sub image data exist. The control program then proceeds to step S9. In step S8, the overlay button 85 is displayed in the default display color (black, for example), in order to indicate an absence of the sub image data. The control program then moves to step S9.

In step S9, the CPU 20 sends a control command to have the thumbnail image transmitted from the electronic camera 5. As a result, the CPU 40 of the electronic camera generates a thumbnail image by reducing, with a predetermined ratio, the main image data that are stored in the RAM 42, and sends the thumbnail image to the personal computer 1 through the I/F 45. The personal computer 1 receives the thumbnail image data sent by the electronic camera 5. The control program then moves to step S10.

In step S10, the CPU 20 writes the thumbnail image data to a predetermined area of the VRAM 23. As a result, the thumbnail image 81 shown in FIG. 7 will be displayed on the CRT display 2. The control program then moves to step S11.

In step S11, the CPU 20 sends a predetermined control command to the electronic camera 5 and determines whether main image data still exist. In other words, the electronic camera 5 searches in RAM 42 for main image data that are not yet displayed on the CRT display 2. The result of the search is sent to the personal computer 1 through the I/F 45.

Upon receiving the search result, the CPU 20 determines whether main image data still exist. If main image data still exist (YES), the control program returns to step S1 and repeats the same process as that described above. If the main image data do not exist (NO), the process ends (END).

Through the process described above, data having the same index are mutually related and are displayed in a table on the screen as shown in FIG. 7. Thus, a user may be able to intuitively grasp the data recorded in the electronic camera 5.

A brief description of the functions of the various buttons provided in the browser window 95 follows.

In FIG. 7, the four buttons that are displayed at the upper left are, clockwise from the left corner: a shutter button 86, an integration button 87, a storage button 88 and a delete button 89.

The shutter button 86 activates the shutter of the electronic camera 5. When the shutter button 86 is pressed, the electronic camera 5 shoots an object that is currently in focus.

The integration button 87 allows display of a full size image (an image for which pixels are not thinned) from the electronic camera 5.

The storage button 88 is operated when the designated main image data and accompanying sub image data or sound data are to be recorded in the hard disk drive 6 shown in FIG. 2.

The delete button 89 is used to delete the data being displayed in the designated thumbnail area 80 from the RAM 42 of the electric camera 5.

When the square that is displayed on the left side of Show Thumbnails (displayed under the delete button 89) is checked, the thumbnail area containing the thumbnail image 81 appears. However, if the square is not checked, only buttons 83 through 85 and the index 82 are displayed.

When the inside of the circle displayed on the left of Sort by Time (displayed below the Show Thumbnails) is checked, the thumbnail area is sorted and displayed according to the date and the time of shooting.

When the inside of the circle displayed on the left of Sort by Name (displayed below the Show Thumbnails) is checked, the thumbnail area is sorted and displayed according to the value of the index.

The button 93 showing two arrows, one pointing up and the other down, which is displayed below Sort by Name, designates a normal order or a reverse order, respectively in sorting. In other words, if the circle on the left of Sort by Time is checked (i.e., Sort by Time is selected), and the arrow pointing down is pressed, then data from the electronic camera 5 are read in the order from the earliest recording date and time to the latest, and the thumbnail areas 80 are displayed sequentially from left to right and top to bottom. If the arrow pointing up is pressed, the thumbnail areas 80 are displayed in the reverse order of recording date and time.

When Sort by Name is selected and the arrow pointing down is pressed, the thumbnail areas 80 are displayed sequentially from left to right and top to bottom in ascending order of the value of the index. If the arrow pointing up is pressed, the thumbnail areas 80 are displayed in the descending order of the value of the index.

Figure 8:
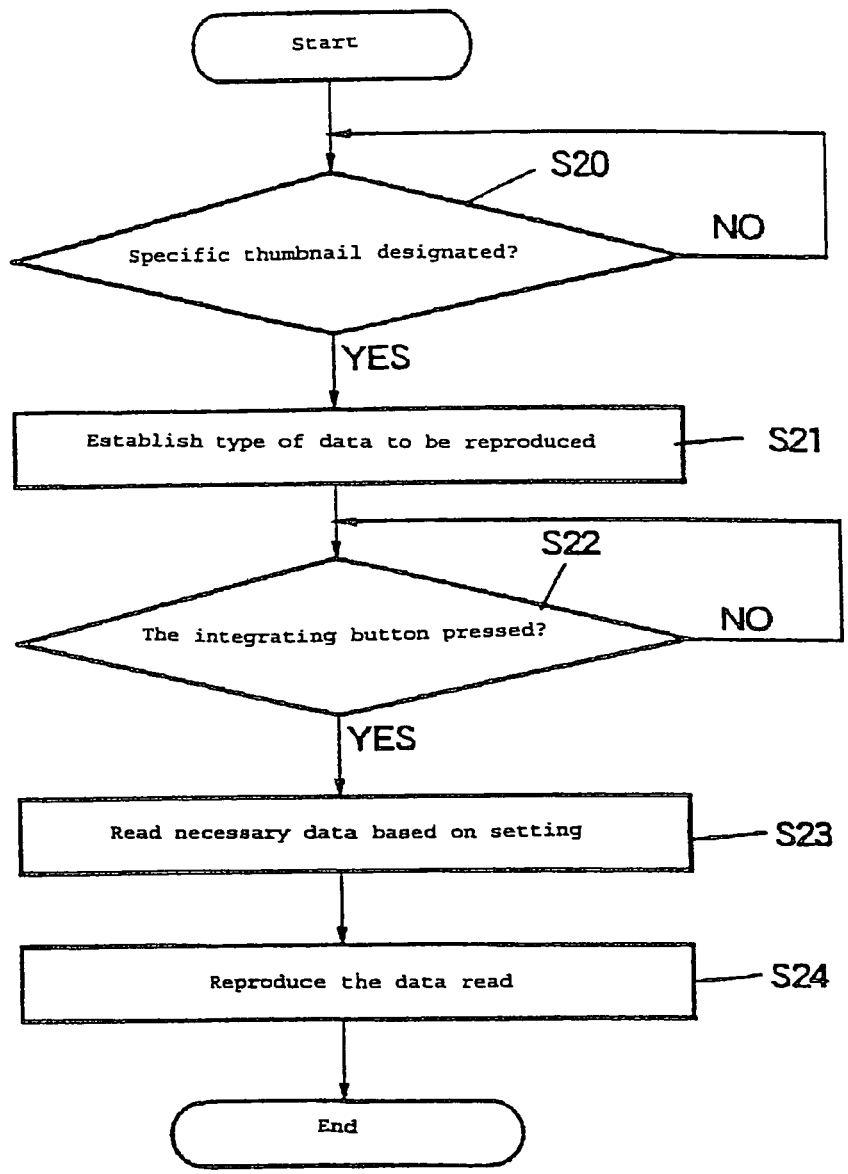
FIG. 8 is a flow chart describing a process in the display example of FIG. 7 in which a predetermined operation is executed.

Next, a process in which various buttons being displayed at the top of the thumbnail area 80 are pressed is described, with reference to the flow chart in FIG. 8. The control program described by the flow chart of FIG. 8 is stored in the hard disk drive 6.

In step S20, the CPU 20 determines whether the specific thumbnail area 80 is designated by a pointing device such as the keyboard 3 or a mouse (not shown). In step S20, if the specific thumbnail area 80 is designated (YES), the control program moves to step S21. If the specific thumbnail area 80 is not designated (NO), the control program returns to step S20 and repeats the same process. The control program then moves to step S21.

In step S21, the type of data to be reproduced is established. For example, when the sound button 84 or the overlay button 85 is pressed (using the keyboard 3 or the mouse (not shown)), the display color is changed to red, for example, indicating that these data will not be reproduced. However, if sound data and sub image data are not recorded, the display color does not change when these buttons are pressed. The control program then moves to step S22.

In step S22, the CPU 20 determines whether an integration button 87, which is displayed on the upper left of the browser window 95, was pressed. If the integration button 87 was pressed (YES), the control program moves to step S23. If the integration button was not pressed (NO), the control program returns to step S22 and repeats the same process.

In step S23, the CPU 20 reads the data designated by the button in the thumbnail area 80 from the electronic camera 5. Then the control program moves to step S24.

If in step S21, the thumbnail area 80 contains both sound and sub image data, the thumbnail area 80 is designated, and only the overlay button 85 is pressed, the display color of the overlay button 83 is changed to red (indicating that reading of sub image data will not be executed).

Then, when the integration button 87 is pressed, the CPU 20 determines that the decision at step S22 is YES and in step S23, the CPU 20 sends predetermined commands to the electronic camera 5, and reads main image data and sound data corresponding to the designated thumbnail area 80 (sub image data are not read because the overlay button 85 is not pressed). The control program then moves to step S24.

In step S24, the main image data corresponding to the designated thumbnail area 80 are displayed within a window that is newly displayed on the CRT 2, and sound is reproduced, after which the process ends (END).

In the process described above, it becomes possible to select and reproduce only necessary data out of all the data recorded in the electronic camera 5. Hence, time spent reproducing unwanted data is eliminated.

In the example of the above-described embodiment, the control program is structured in such a manner that when the sound button 84 is pressed, sound data are determined to be unnecessary and the reproduction of sound is stopped. However, the control program may be structured in such a manner that when the sound button 84 is pressed, only sound data are read and reproduced from the electronic camera 5.

Figure 9:
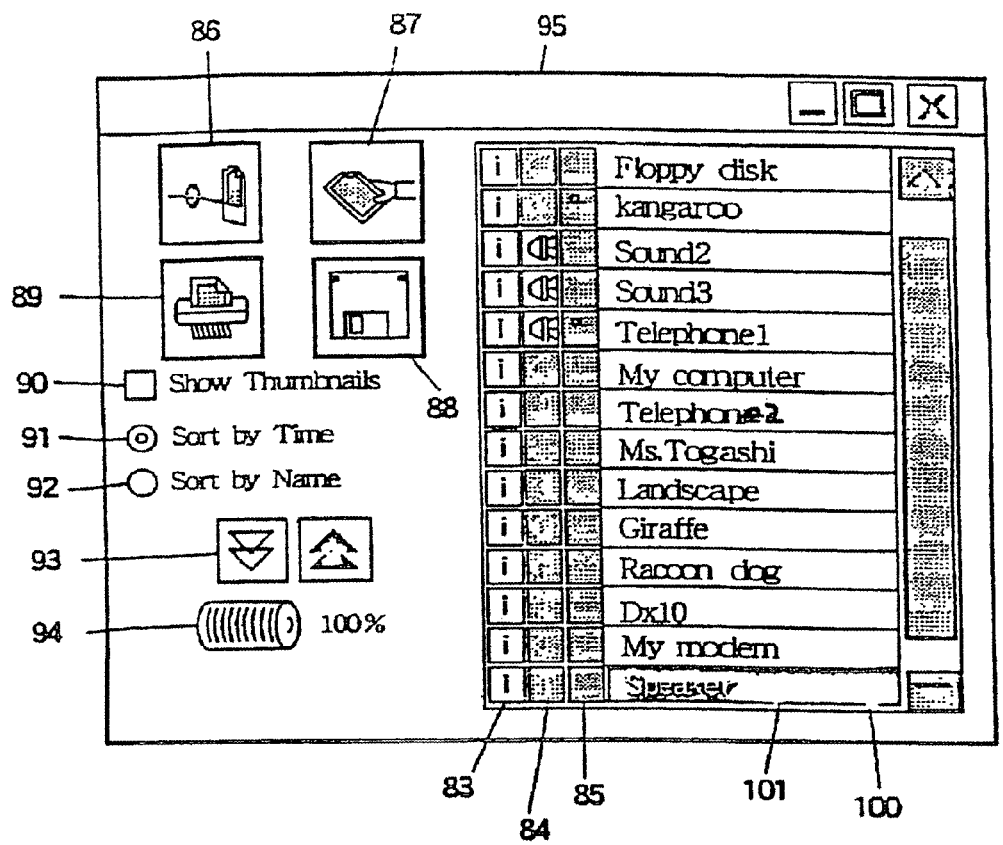
FIG. 9 is another display format of the table shown in FIG. 6.

FIG. 9 is a display example of the browser window 95 of FIG. 7 when the square on the left of Show Thumbnails is not checked. In this example, every set of main image data has a unique file name. Also in this example, the parts that are the same as in FIG. 7 are denoted with the same symbols and their explanation is omitted.

As shown in FIG. 9, a plurality of small boxes 100, each consisting of a file name 101, an information button 83, a sound button 84 and an overlay button 85 are displayed in the browser window 95. With this display method, it is not necessary to display a thumbnail image. Thus, the time required to read the thumbnail image data from the electronic camera 5 and to execute the reproduction process may be reduced, enabling a speedy display. Moreover, in contrast to the example of FIG. 7, by not displaying the thumbnail image, the display area may be reduced. Thus, many file names may be displayed on the screen simultaneously. As a result, speedy selection of data becomes possible, particularly when many data are recorded.

Figure 10:
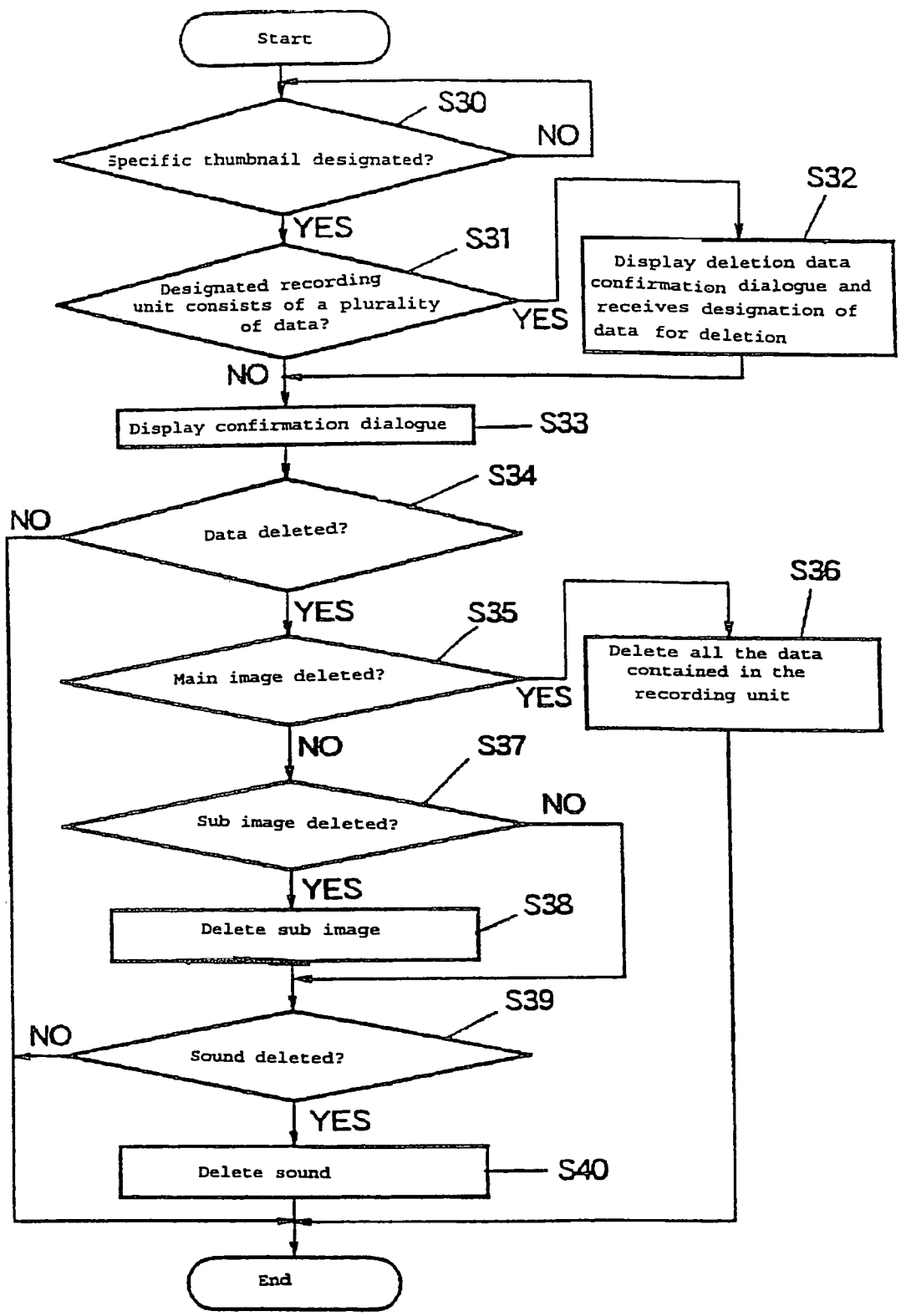
FIG. 10 is a flow chart describing a data deletion process.

A data deletion process in which the deletion button 89, displayed at the top of the browser window 95, is pressed is described hereafter, with reference to the flow chart in FIG. 10. The control program described by the flow chart of FIG. 10 is stored in the hard disk drive 6.

In step S30, the CPU 20 determines whether the specific thumbnail area 80, which is displayed on the CRT display 2, is designated by operation of the keyboard 3, for example (see FIG. 7). If the specific thumbnail area 80 is not designated (NO), the control program returns to step S30 and repeats the same process. If the specific thumbnail area 80 is designated (YES), the control program moves to step S31.

In step S31, the CPU 20 determines whether the recording unit corresponding to the designated thumbnail area 80 includes a plurality of data. If the designated recording unit includes only main image data (NO), the control program proceeds to step S33. If the designated recording unit includes a plurality of data (YES), the CPU 20 moves to step S32.

Figure 11:
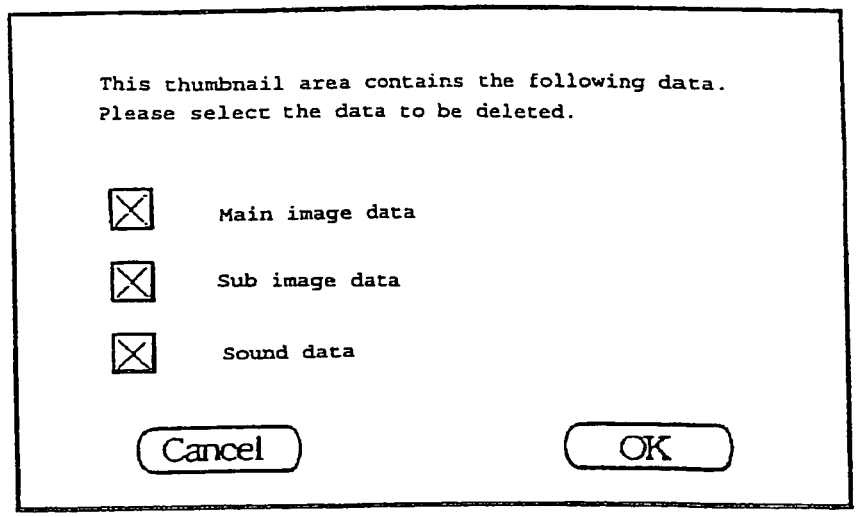
FIG. 11 is a display example of the deletion data confirmation dialogue displayed when the process of FIG. 10 is executed.

In step S32, the CPU 20 displays a deletion data confirmation dialogue, which is shown in FIG. 11, by writing predetermined data in the VRAM 23, and receives the designation for data to be deleted. In FIG. 11, if the sub image data are to be deleted, for example, the inside of the square, which is displayed on the left of "sub image data", is checked (by use of the keyboard 3, for example). An "x" is then displayed inside the square, indicating that the sub image data are selected as the target of deletion. In this display example, an "x" is displayed in all the squares, which indicates that all the data are the target of deletion. Then, when the "OK" button is pressed in the dialogue, the control program moves to step S33. However, if in step S32, the "Cancel" button is pushed, the control program is interrupted and the process ends (END).

If sub image data or sound data are not contained in the designated recording unit, a display for the data does not appear. For example, if sound data are not contained in the designated recording unit, a choice for "sound data" will not be displayed in the deletion data confirmation dialogue that is shown in FIG. 11.

Figure 12:
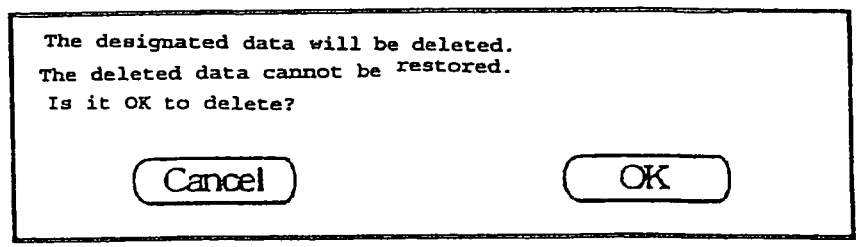
FIG. 12 is a display example of the deletion re-confirmation dialogue displayed when the process of FIG. 10 is executed.

In step S33, the CPU 20 shows the deletion reconfirmation dialogue of FIG. 12 on the CRT display 2 by writing the predetermined data in the VRAM 23. The control program then moves to step S34.

In step S34, the CPU 20 determines whether the "OK" button is pressed in the deletion confirmation dialogue. If the "OK" button was pressed (YES), the control program moves to step S35. However, if the "Cancel" button was pressed (NO), the process ends (END).

In step S35, the CPU 20 compares the information input in the deletion data confirmation dialogue of FIG. 11 and determines whether main image data are deleted. In other words, the CPU 20 determines whether the square that is displayed on the left of "main image data" in the deletion confirmation dialogue is checked. If the main image data are not to be deleted (NO), the control program proceeds to step S37. If the main image data are to be deleted (YES), the control program moves to step S36.

In step S36, all the data contained in the thumbnail area 80 designated at step S30 are deleted from the RAM 42 of the electronic camera 5. In other words, if main image data is deleted, there is no reason to retain the sub image data or the sound data. Hence, if the main image data are deleted, the sub image data and sound data are also deleted. The data are deleted when the CPU 20 outputs a predetermined control command to the electronic camera 5 through the I/F 24. The CPU 40 of the electronic camera 5 receives the command through the I/F 45 and deletes the predetermined data recorded in the RAM 42. The control program then ends (END).

In step S37, the CPU 20 determines whether the sub image data are selected as the target of deletion in the deletion confirmation dialogue. If the sub image data are selected as the target of deletion (YES), the control program moves to step S38. If the sub image data are not selected as the target of deletion (NO), the control program proceeds to step S39.

In step S38, the CPU 20 sends a predetermined control command to the electronic camera 5 through the I/F 24, similar to the case in which the main image data are deleted. As a result, the CPU 40 of the electronic camera 5 deletes the predetermined sub image data, which are recorded in the RAM 42, according to the control command being received. The control program then moves to step S39.

In step S39, the CPU 20 determines whether sound data are selected as the target of deletion in the deletion confirmation dialogue. If the sound data are selected as the target of deletion (YES), the control program moves to step S40. If the sub image data are not selected as the target of deletion (NO), the process ends (END).

In step S40, the CPU 20 sends a predetermined control command to the electronic camera 5 through the I/F 24, similar to the case in which main image data are deleted. As a result, the CPU 40 of the electronic camera 5 deletes the predetermined sound data, which are recorded in the RAM 42, according to the control command being received. Then the process ends (END).

In the process described above, the desired recording unit is designated in the thumbnail area 80 and the desired data are designated in the deletion data confirmation dialogue. The desired data are then deleted from the data contained in the designated recording unit. Thus, unnecessary information can be selectively deleted.

In the deletion data confirmation dialogue of FIG. 11, if main image data are selected as the target of deletion (the inside of the square on the left of main image data is checked), an "x" may be automatically displayed in the squares on the left of other data being displayed in the deletion data confirmation dialogue (sub image data or sound data), indicating that other data will be deleted with the main image data. Continuously displaying an "x" in the square on the left of the sub image data or the sound data, as long as the main image data are not deleted, makes the display process even easier to understand.

In the configuration of the embodiment described above, data that do not contain main image data (data comprising only sub image or sound data) are not allowed. However, a recording unit comprising recording data that does not include main image data (sub image data or sound data) may also be allowed.

Figure 13:
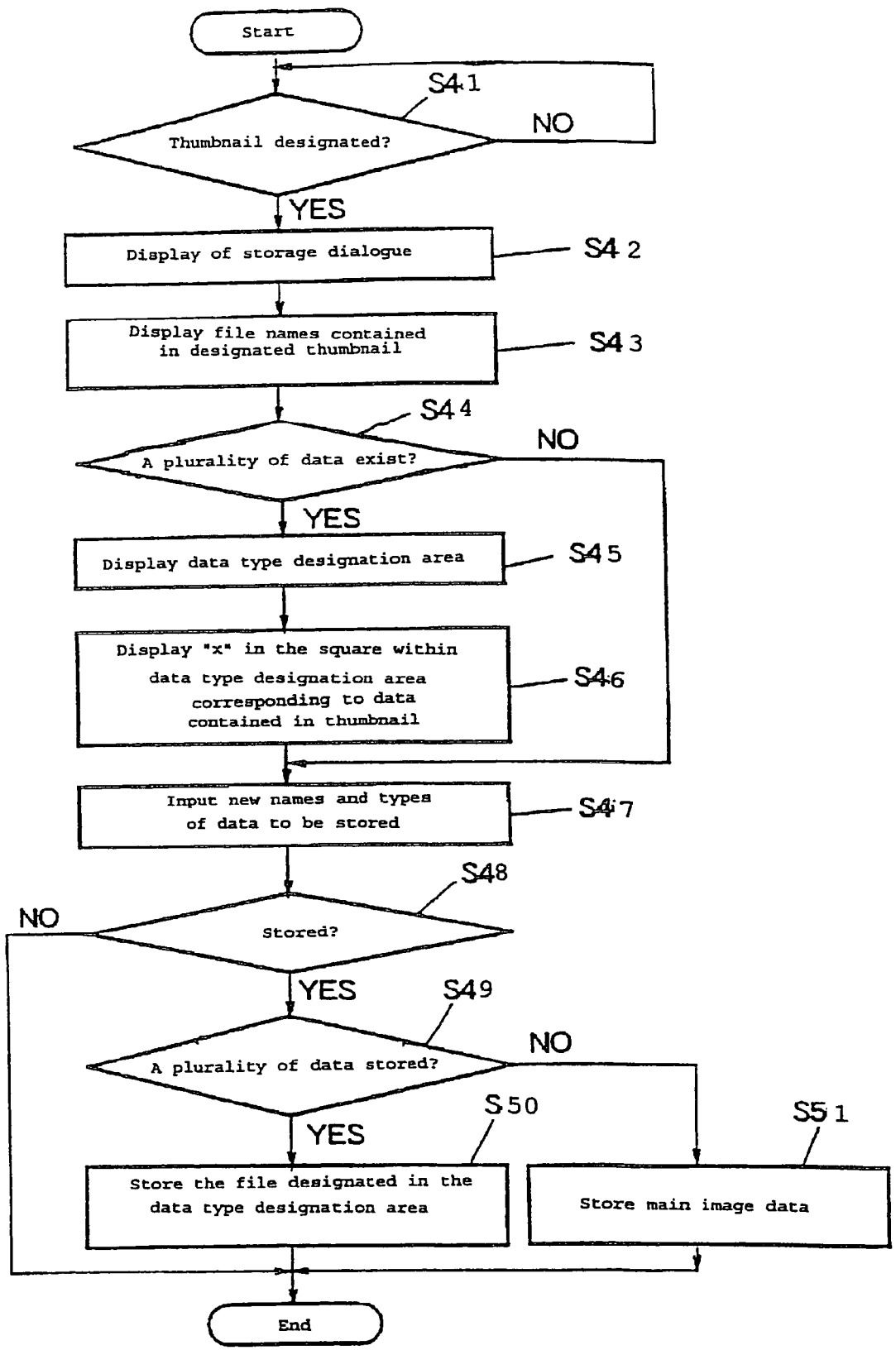
FIG. 13 is a flow chart describing an example of a process that is executed when a storage button is pressed in the display example of FIG. 7.

A data reading and storage process in which the storage button 88, displayed at the top of the browser window 95, is pressed will be described next, with reference to the flow chart in FIG. 13. The control program described by the flow chart of FIG. 13 is stored in the hard disk drive 6.

In step S41, the CPU 20 determines whether the specific thumbnail area 80, which is displayed on the CRT display 2, is designated by the keyboard 3 (see FIG. 7). If the specific thumbnail area 80 is not designated (NO), the control program returns to step S41 and repeats the same process. If the specific thumbnail area 80 is designated (YES), the control program moves to step S42.

Figure 14:
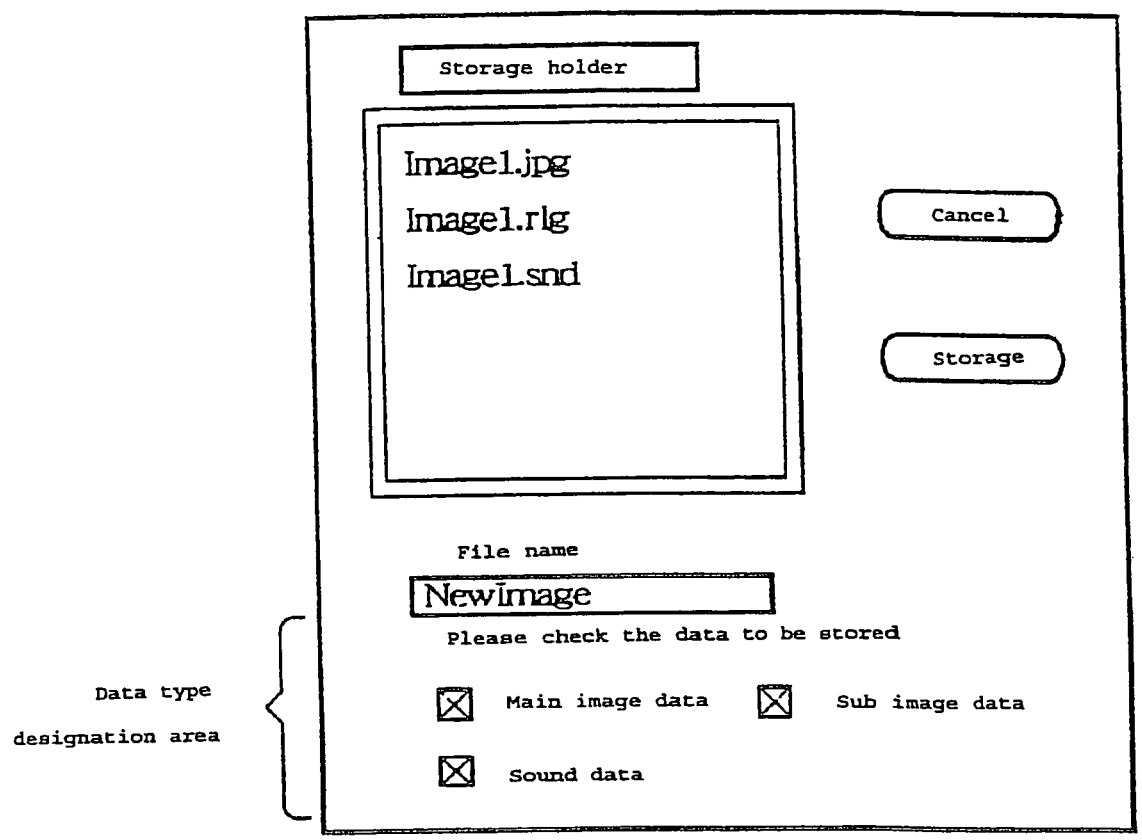
FIG. 14 is a display example of a storage folder that is displayed when the process of FIG. 13 is executed.

In step S42, the CPU 20 writes predetermined data in the VRAM 43 and causes the storage dialogue shown in FIG. 14 to be displayed. The control program then moves to step S43.

In step S43, the CPU 20 reads from the electronic camera 5 the file name of the file corresponding to the data contained in the thumbnail area 80, which is designated in step S41, and displays the file name in the storage dialogue frame. In this display example, "Image1.jpg" (main image data file), "Image1.rlg"(sub image data file), "Image1.snd" (sound data file) are displayed. The control program then moves to step S44.

In step S44, the CPU 20 determines whether a plurality of data are contained in the designated thumbnail area 80. If a plurality of data exist (YES) in the designated thumbnail area 80, the control program moves to step S45. If a plurality do not exist (NO), the control program proceeds to step S47.

In step S45, a data type designation area is displayed below the storage dialogue. In the present example, the main image data, sub image data and sound data are contained in the designated thumbnail area 80. Thus, the names of these three data are displayed along with a statement "Please check the data to be stored." The data type designation area is not displayed and only main image data are contained in the recording unit. The control program then moves to step S46.

In step S46, the CPU 20 displays an "x" inside a square corresponding to the data contained in the thumbnail area 80. In the present example, all the data (main image data, sub image data and sound data) are contained in the thumbnail area 80. Thus, an "x" is displayed inside all the squares in the data type designation area. The control program then moves to step S47.

In step S47, the new file name and the type of data to be stored are input. In other words, the new file name is input inside the frame that is below the display "File Name" in the storage dialogue. Moreover, when the square in the data type designation area is checked, an "x" is displayed or deleted. Thus, the type of data to be stored may be designated by causing an "x" to be displayed inside the square corresponding to the data to be stored and by causing the square corresponding to the data that need not be stored to be left blank. The control program then moves to step S48.

In step S48, the CPU 20 determines whether the designated data are to be stored. In other words, the CPU 20 determines whether the "storage" button was pressed in the storage dialogue of FIG. 14. If the "storage" button was pressed (YES), the control program moves to step S49. If the "storage" button was not pressed, the process ends (END).

In step S49, the CPU 20 determines whether a plurality of data are contained in the thumbnail area 80, which is designated in step S41. If a plurality of data exist (YES) in the designated thumbnail area 80, the control program moves to step S50. If a plurality of data do not exist (NO) (main image only), the control program proceeds to step S51.

In step S50, the CPU 20 sends a predetermined control command to the electronic camera 5. As a result, the CPU 40 of the electronic camera 5, which receives the control command, compares the data type designation area of the storage dialogue shown in FIG. 14, reads the designated data from the RAM 42, and sends the data to the personal computer 1 through the I/F 45. The CPU 20 receives the data (file) sent, changes the file name of each file to a new name designated by the storage dialogue, and outputs the new name to the hard disk drive 6, which records the new name.

In the example of the storage dialogue shown in FIG. 14, three file names, Image1.jpg, Image1.rlg and Image1.snd are read from the electronic camera, are renamed, respectively, NewImage.jpg, NewImage.rlg and NewImage.snd, and are output to and recorded in the hard disk drive 6. The control program then ends (END).

In step S49, if the designated thumbnail area 80 does not contain a plurality of data (NO), the control program moves to step S51. In step S51, the CPU 20, through the same process as in the previous case, reads the main image data, Image1.jpg, from the electronic camera 5, renames it to the new file name, NewImage.jpg, and outputs the new file name to the hard disk drive 6, which records the new name. The control program then ends (END).

In the process described above, it becomes possible to read only desired data from the data recorded for each recording unit in the electronic camera 5 to the personal computer 1. Then, only the desired data are given a new file name and output to and recorded in the hard disk drive 6.

In the embodiment described above, a different file name (extension element) is given to the main image data, the sub image data and the sound data. The three files are then recorded in the hard disk drive 6. However, it is also possible to integrate and record these data as one file.

Figure 15:
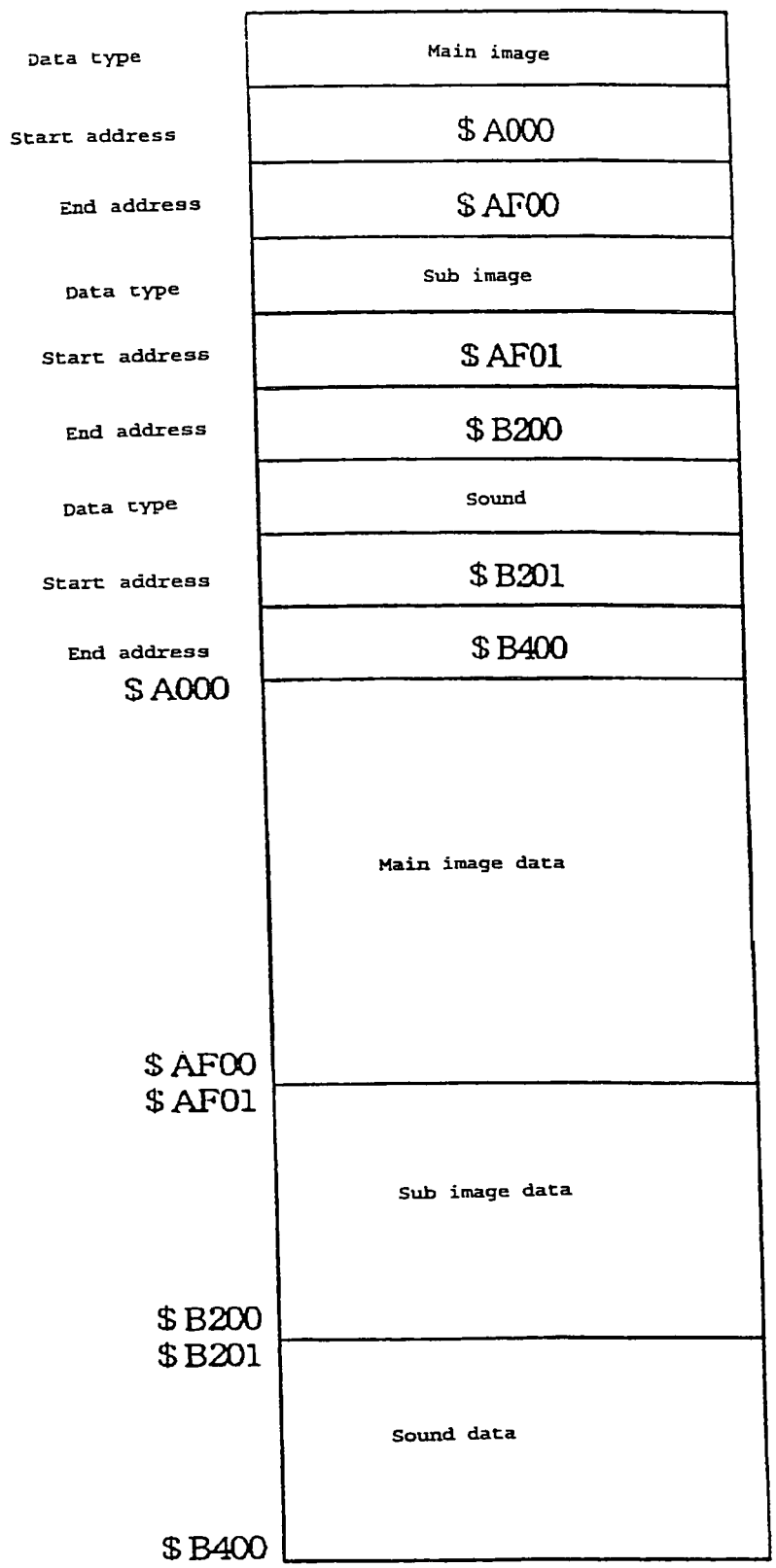
FIG. 15 is a file format that is recorded in a hard disk drive when the process of FIG. 13 is executed.
Figure 16:
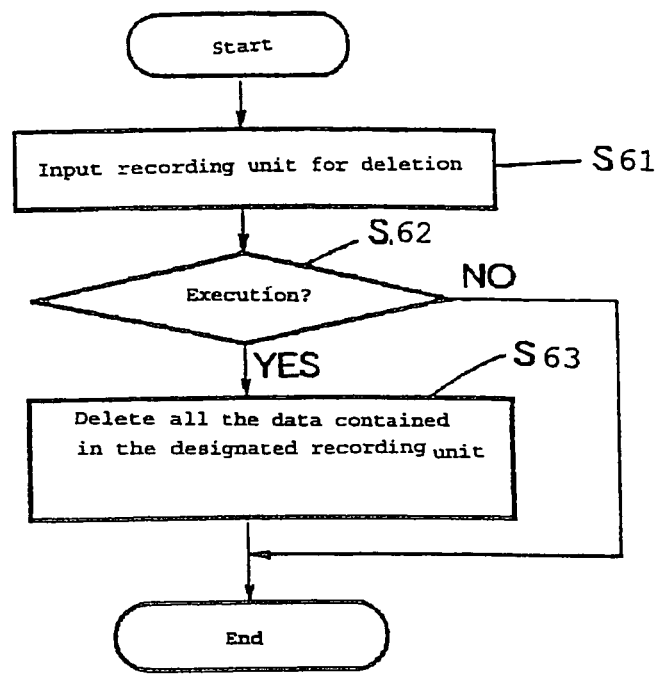
FIG. 16 is a flow chart describing an example of a conventional data deletion process.
Figure 17:
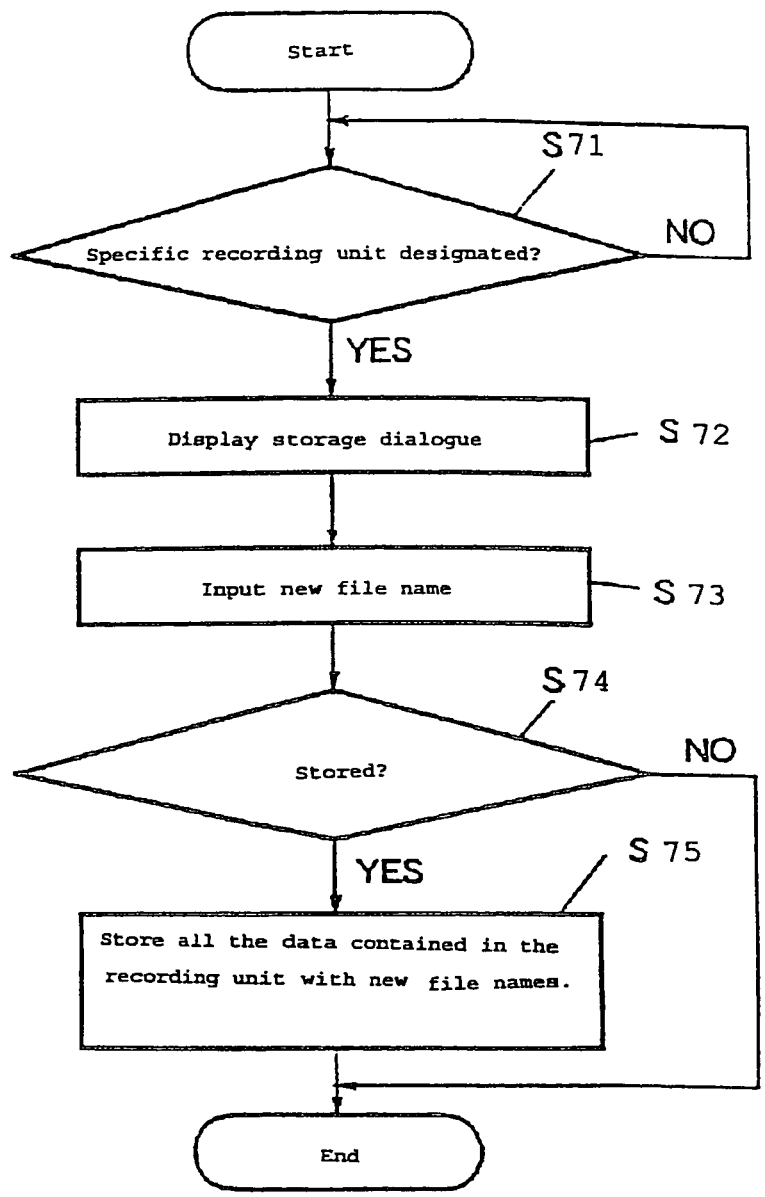
FIG. 17 is a flow chart describing an example of a conventional data storage process.
Figure 18:
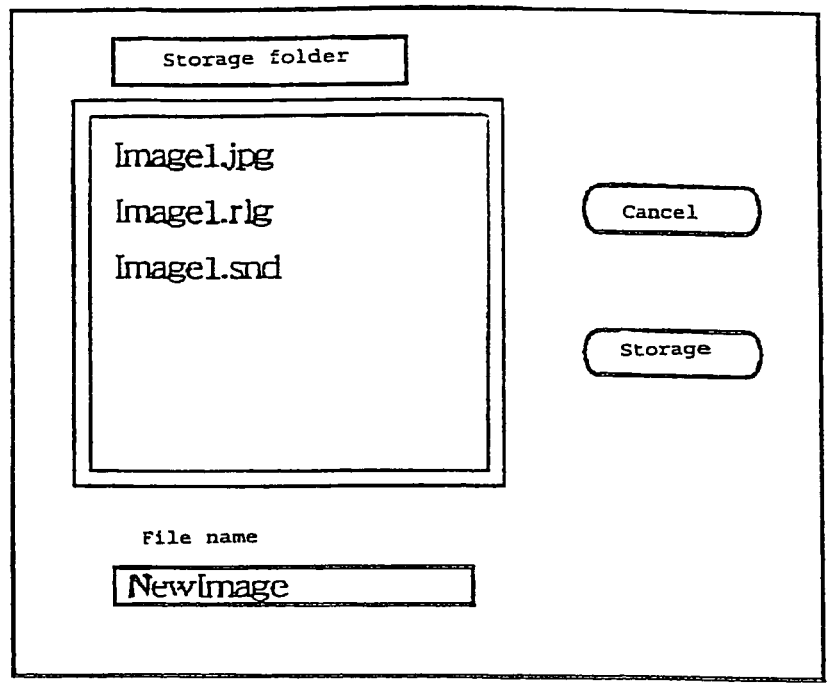
FIG. 18 is a display example of a storage folder that is displayed when the process of FIG. 17 is executed.

FIG. 15 is an example of a data format in which a plurality of the data are integrated and recorded as one file.

In this example, the data type (main image) is stored in the leading section of the file, following which the starting address ($A000) and the ending address ($AF00) of the main image data are stored. The data type (sub image), and the starting address ($AF01) and the ending address ($B200) of the sub image address data are stored following the data relating to the main image data. Next, the data type (sound) and the starting address ($B201) and the ending address ($B400) of the sound are stored following the data relating to the sub image data.

The main image data are stored in the area indicated by the address from $A000 to $AF00, which comprise the starting address and the ending address of the main image data. Next, the sub image data are stored in the area indicated by the address from $AF01 to $B200, which comprise the starting address and the ending address of the sub image data. Finally, the sound data are stored in the area indicated by the address from $B201 to $B400, which comprise the starting address and the ending address of the sound data.

In the configuration of the embodiment described above, a plurality of data may be integrated and recorded as one file. Therefore, in searching a file recorded on a hard disk drive, for example, the time required for searching may be reduced. Moreover, because the area in which the file names are recorded (FAT: file allocation table) is reduced in addition to the space inserted between files being eliminated, the area needed to record the data may also be reduced.

In the illustrated embodiment, a suitably programmed general purpose computer controls data processing. However, the processing functions could also be implemented using a single special purpose integrated circuit (e.g., an ASIC) having a main or central processor section for overall, system-level control, and separate circuits dedicated to performing various specific computations, functional and other processes under control of the central processor section. The processing can also be implemented using a plurality of separate dedicated or programmable integrated electronic circuits or devices (e.g., hardwired electronic or logic devices). In general, any device or assembly of devices on which a finite state machine capable of implementing the flow charts of FIGS. 6, 8, 10 and 13 can be used to control data processing.

The invention has been described with reference to the preferred embodiments thereof, which are illustrative and not limiting. Various changes may be made without departing from the spirit and scope of the invention as defined in the following claims.

What is claimed is:

1. An information processing device that is removably connected to an electronic device that correlates image data to other data related to the image data as a recording group, using relation information, and records these data to a recording medium, the information processing device comprising:
 a first input portion that inputs from the electronic device (i) first information showing existence or non-existence of other data correlated to the image data and (ii) information that specifies the image data,
 a display control portion that (1) generates display information showing the existence or non-existence of the other data correlated to the image data, based on the first information, and (2) displays the display information and the information that specifies the image data on a display device next to each other,
 an instruction portion that instructs whether to input other data correlated to the image data from the electronic device, based on a first manual operation, and
 a second input portion that (a) inputs the image data and other data correlated to the image data from the electronic device, based on a second manual operation, when the instruction portion instructs that the other data is to be input from the electronic device, and (b) inputs the image data from the electronic device, based on the second manual operation, when the instruction portion instructs that the other data is not to be input from the electronic device.

2. The information processing device as set forth in claim 1,
 wherein the display control portion displays a symbol, showing whether the other data correlated to the image data is scheduled to be input from the electronic device, on a display device, based on the first manual operation.

3. The information processing device as set forth in claim 2,
 wherein a plurality of types of the other data exist, and
 the display control portion displays at least one symbol, showing whether the other data is scheduled to be input from the electronic device, on a display device, for respective types of the other data.

4. The information processing device as set forth in claim 1,
 wherein the information that specifies the image data is data of a reduced image that has been created by reducing a main image stored in the electronic device, and
 the display control portion displays a first operation screen including (i) a display area that correlates and displays (a) display information showing existence or non-existence of the other data correlated to the image data and (b) the reduced image, based on data of the first information and the reduced image, and (ii) a display area that displays a take-in button to take in the image data from the electronic device, and
 the second manual operation is an operation with respect to the take-in button.

5. The information processing device as set forth in claim 1,
 wherein the electronic device is an electronic camera.

6. The information processing device as set forth in claim 1, wherein the image data is recorded to a first file on the recording medium, and the other data is recorded to a second file on the recording medium, the second file being different from the first file.

7. An information processing device that is removably connected to an electronic device that correlates image data to other data related to the image data as a recording group, using relation information, and records these data to a recording medium, the information processing device comprising:
 a first input portion that inputs from the electronic device (i) first information showing existence or non-existence of other data correlated to the image data and (ii) information that specifies the image data,
 a first display control portion that correlates the image data to the other data and displays these data as a list on a display device, based on the first information and the information that specifies the image data,
 a second display control portion that displays on the display device a screen at which instructions are received from a user as to whether to delete the other data included in a specified recording group without deleting the image data in the specified recording group, when there is an instruction to delete data of the specified recording group by a first manual operation, and
 a control portion that makes the electronic device delete the other data without deleting the image data, based on receiving an instruction from a user to delete the other data.

8. The information processing device as set forth in claim 7,
 wherein the second display control portion makes a display device display on the screen a symbol showing whether the other data is scheduled to be deleted from the electronic device, based on whether a user instructs to schedule deletion of the other data, and
 the control portion makes the electronic device delete the other data corresponding to the symbol showing that deletion is scheduled, based on receiving an instruction from a user to delete the other data.

9. The information processing device as set forth in claim 8,
 wherein a plurality of types of the other data exist, and
 the second display control portion displays at least one symbol on the display device for respective types of the other data.

10. The information processing device as set forth in claim 7,
 wherein the electronic device is an electronic camera.

11. An information processing method for use in an information processing device that is removably connected to an electronic device that correlates image data to other data related to the image data as a recording group, using relation information, and records these data to a recording medium, the method comprising:
 inputting first information showing existence or non-existence of other data correlated to the image data from the electronic device;
 inputting information that specifies the image data from the electronic device;
 generating display information showing the existence or non-existence of the other data correlated to the image data, based on the first information;
 displaying the display information and the information that specifies the image data on a display device next to each other;
 instructing whether to input other data correlated to the image data from the electronic device, based on a first manual operation;
 inputting the image data and other data correlated to the image data from the electronic device, based on a second manual operation when the instructing instructs that the other data is to be input from the electronic device; and inputting the image data from the electronic device, based on the second manual operation, when the instructing instructs that the other data is not to be input from the electronic device.

12. The information processing method as set forth in claim 11, wherein the displaying includes displaying a symbol, showing whether the other data correlated to the image data is scheduled to be input from the electronic device, based on the manual operation.

13. The information processing method as set forth in claim 12, wherein a plurality of types of the other data exist, and the displaying displays at least one symbol, showing whether the other data is scheduled to be input from the electronic device, for respective types of the other data.

14. The information processing method as set forth in claim 11, wherein the information that specifies the image data is data of a reduced image that has been created by reducing a main image stored in the electronic device, and the displaying displays (1) a display area that correlates and displays (a) display information showing existence or non-existence of the other data correlated to the image data and (b) the reduced image, based on data of the first information and the reduced image, and (ii) a display area that displays a take-in button to take in the image data from the electronic device, and the second manual operation is an operation with respect to the take-in button.

15. The information processing method as set for in claim 11, wherein the image data is recorded to a first file on the recording medium, and the other data is recorded to a second file on the recording medium, the second file being different from the first file.

16. An information processing method for use in an information processing device that is removably connected to an electronic device that correlates image data to other data related to the image data as a recording group, using relation information, and records these data to a recording medium, the method comprising:

inputting first information showing existence or non-existence of other data correlated to the image data from the electronic device;

inputting information that specifies the image data from the electronic device;

correlating the image data to the other data and displaying these data as a list on a display device based on the first information and the information that specifies the image data;

displaying on the display device a screen at which instructions are received from the user as to whether to delete the other data included in a specified recording group without deleting the image data in the specified recording group, when there is an instruction to delete data of the specified recording group by a first manual operation; and automatically controlling the electronic device to delete the other data without deleting the image data, based on receiving an instruction from a user to delete the other data.

17. The information processing method as set forth in claim 16, wherein the display device is controlled to display a symbol showing whether the other data is scheduled to be deleted from the electronic device, based on whether a user instructs to schedule deletion of the other data, and the automatically controlling the electronic device includes automatically controlling the electronic device to delete the other data corresponding to the symbol showing that deletion is scheduled, based on receiving an instruction from a user to delete the other data.

18. The information processing method as set forth in claim 17, wherein a plurality of types of the other data exist, and the displaying displays at least one symbol on the display device for respective types of the other data.

* * * * *